United States Patent [19]

Steele

[11] B 3,985,188

[45] Oct. 12, 1976

[54] EXTENSION ATTACHMENT DEVICE FOR A POWER TOOL

[76] Inventor: Vernon P. Steele, 22 Fairview Terrace, Glenville, Conn. 06830

[22] Filed: Apr. 11, 1975

[21] Appl. No.: 567,058

[44] Published under the second Trial Voluntary Protest Program on January 13, 1976 as document No. B 567,058.

[52] U.S. Cl. .............................. 173/170; 30/296 R; 74/544

[51] Int. Cl.$^2$ .............................. B23B 45/00

[58] Field of Search .............................. 173/170, 171; 30/DIG. 1, 500, 296, 121; 74/543, 544, 551.8; 81/DIG. 1, DIG. 12; 200/61.85

[56] References Cited

UNITED STATES PATENTS

| | | | |
|---|---|---|---|
| 2,643,088 | 6/1953 | Hornack | 173/170 X |
| 2,730,803 | 1/1956 | Kimball | 30/296 X |
| 3,086,574 | 4/1963 | Ustin | 173/170 X |
| 3,272,267 | 9/1966 | Langas | 173/170 |
| 3,805,385 | 4/1974 | Ritums et al. | 30/DIG. 1 |

*Primary Examiner*—J. Karl Bell
*Attorney, Agent, or Firm*—Alfred E. Miller

[57] ABSTRACT

An extension attachment device for power tools, such as an explosive-actuated riveter, in which the power tool can be activated remotely by means of an operator applying force in only a single direction. The cradle on the extension attachment device for removably holding a tool is constructed and arranged to accommodate a variety of power tools in order to perform work in locations normally accessible only by ladder.

9 Claims, 4 Drawing Figures

EXTENSION ATTACHMENT DEVICE FOR A POWER TOOL

BACKGROUND OF THE INVENTION

In the past, if it was desired, for example, to affix ceiling panels by means of a power tool directly to the ceiling, it was necessary to use a ladder and move the ladder from location to location as the worker climbed the ladder many times in order to perform the assigned work. A work-saving solution would be to devise some type of extension which would permit the worker to perform the work while standing on the floor or ground. An extension attachment is known for a power tool, such as an explosive-actuated riveter, which has no safety features and additionally requires the use of both hands applying force in opposite directions thereby making it extremely difficult to rivet ceiling panels.

SUMMARY OF THE INVENTION

It is an object of the present invention to provide an extension attachment for a power tool that can be operated by applying force in one direction only, i.e., toward the material or object to be worked on.

Another object of the present invention is to incorporate a safety feature on the extension attachment which releases an operating shaft for movement to actuate the power tools only when it is desired to operate said tool. Otherwise, the operating is locked in place and the extension device remains inactive.

A further object of the present invention is to provide a remote operator for a power tool constituting an extension attachment that is relatively inexpensive to manufacture and is reliably effective for the purposes intended.

The invention will now be more fully described with reference to the accompanying drawings, in which.

Figure 3:
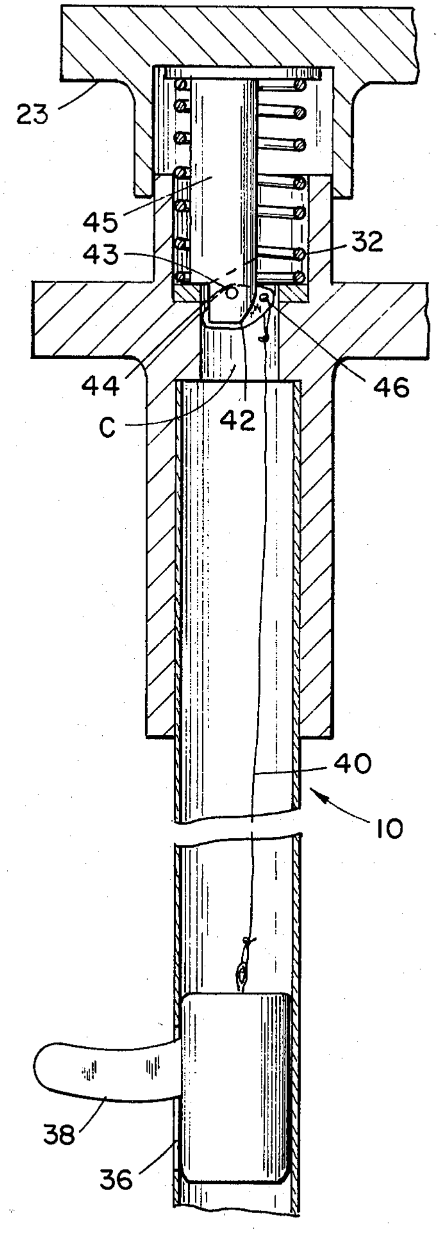
Figure 4:
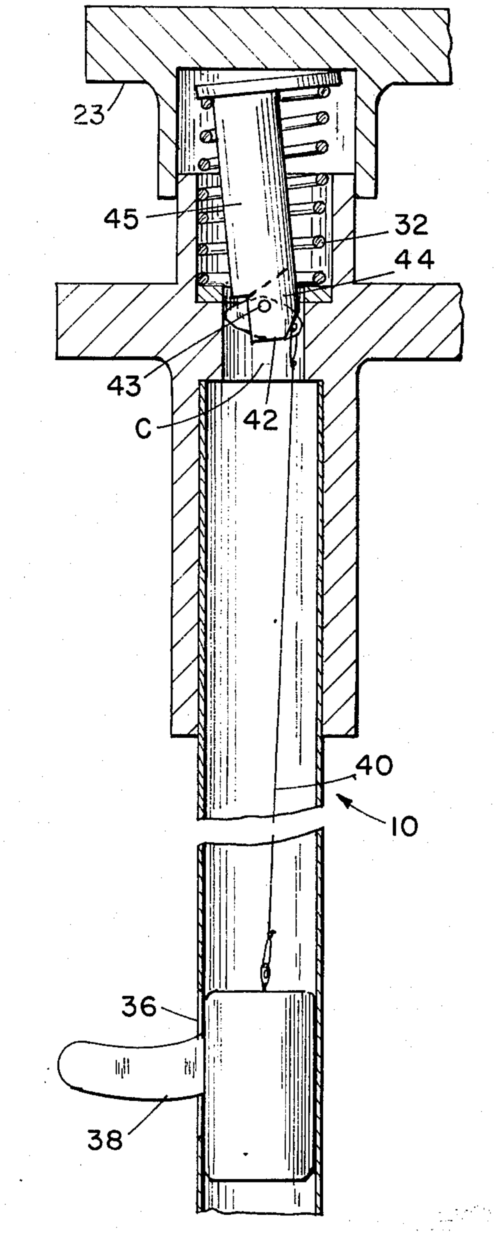

FIG. 3 is a vertical sectional view of the extension attachment device in which the internal pivotable cam member and associated structure are shown that function as an abutment stop safety feature rendering the device inoperable, and FIG. 4 is a vertical sectional view of the cam and associated structure in another position in which the safety device is released and the device is capable of being operated.

DESCRIPTION OF THE PREFERRED EMBODIMENT

Figure 1:
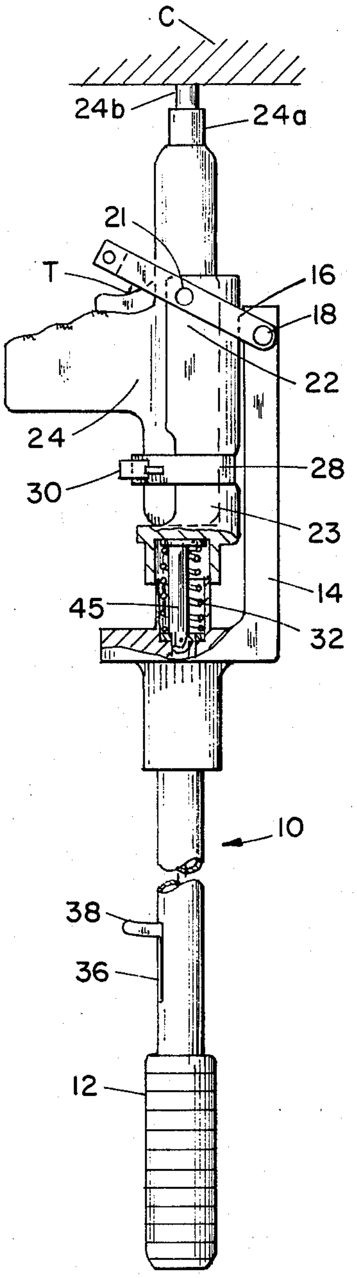
FIG. 1 is a side elevational view of the extension attachment device shown with a power tool thereon, and before performing a riveting operation on the ceiling.
Figure 2:
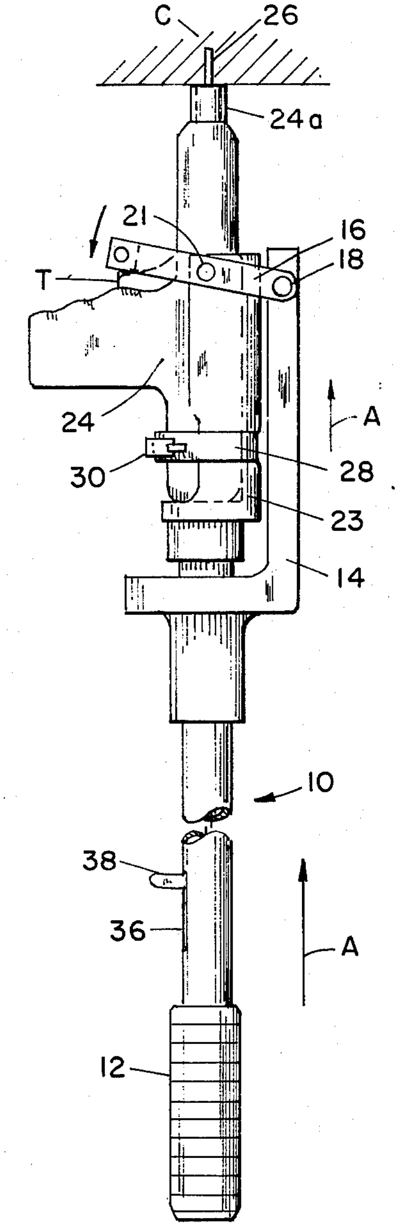
FIG. 2 is a side elevational view of the extension attachment device shown in FIG. 1 with the power tool being operated and driving a rivet into the ceiling.

Referring to FIGS. 1 and 2, an extension pole referred to generally by the numeral 10 is provided with a handle 12 at the lower end and an upstanding plate-like member 14 at the upper end. The plate 14 is provided with a U-shaped yoke 16 that is pivotally connected at 18 to the upstanding plate member. The yoke is further pivotally arranged at 21 on the upstanding sides 22 of a cradle 23. As seen in dotted lines in FIGS. 1 and 2, a tool 24, such as an explosive-actuated riveting device, is positioned in the cradle 23 with its operating nozzle **24*a* facing upwardly. The tool 24 is a well known type of riveting device in which the rivet is driven into an object such as the ceiling C in FIG. 2 by means of an explosive charge. As a safety precaution in this type of tool the extreme tip 24*b* must be depressed before the trigger T of the tool can be actuated. In this connection, FIG. 2 shows the tip 24*b* completely depressed against the ceiling C. The rivets 26 are fed into the magazine of the tool by means of a clip (not shown). The tool 24 is removably held in the cradle by means of a clamp 28 provided with a swinging bar arm 30** that provides a toggle clamping effect and securely maintains the tool in the cradle.

It is to be noted that as the pole 10 is moved in the direction of the arrow A, the yoke 16 pivots around the pivot points and the internal helical spring 32 is compressed and the cradle 23 remains in a stationary position. The pivoting of the yoke 16 causes the bight thereof to engage the trigger T of the tool 24 and to press the trigger until the power tool is actuated and the rivet driven into the ceiling C.

The pole 10 has an elongated slot 36 adjacent to the handle 12. A finger actuator 38 is shown projecting from the slot and, as seen in FIGS. 3 and 4, is operatively connected to one end of a cable 40. The other end of the cable 40 is secured to an outer portion of a cam 42. The latter is pivotally connected at 43 between the downwardly projecting legs 44 of a hollow element 45 that is captured within the confines of the helical spring 32. FIG. 3 shows the normal position of the cam abutting a surface of the internal ledge 46 of pole 10 whereby the hollow element 45 abuts at one end the cradle 23 and the other end abuts a surface of the pole 10. The movable pole 10 is then locked to the stationary cradle 23 and there is not sufficient relative movement possible between the pole and the stationary cradle to actuate the trigger of the tool 24. However, when the finger actuator 38, is pulled, the cam 42 pivots to the position shown in FIG. 4 in which the cam 42 drops off the ledge 46 and locates itself and the bottom portion of the hollow element 45 in the chamber C of the pole 10 so that the latter can move linearly a sufficient amount in connection with the desired objective of remote operation of the power tool, such as the activation of the trigger thereof.

It will be apparent that an operator of the present extension device for actuating a power tool can operate the same with one hand, and the forces exerted on the device are all in the same direction, making it much easier for the user to operate efficiently and for longer periods of time. Moreover, the pivoting yoke enables a more positive actuation of the trigger T.

It should also be evident that other types of power tools may be used effectively on this extension device, such as power drills, stapling machines, power screw drivers, etc. In addition, the present assembly can be utilized in steel mills, or the like, for the remote operation of ingot handling devices.

What is claimed is:

1. An extension attachment device for a power tool having an operating means and comprising an elongated pole provided with a handle at one end and an element at the other end having a pivotable member, a stationary support member provided with means for removably securing a power tool thereon, resilient means positioned between said pole and said stationary support and operatively connecting said pole and said stationary support whereby said pole is capable of linear movement upon the application of force in a predetermined direction and said pivotable member pivots to a position in which the operating means of said power tool is actuated.

2. An extension attachment device as claimed in claim 1 wherein said pivotable member is pivoted at pivot points on both said element and said stationary support member.

3. An extension attachment device as claimed in claim 2 wherein said pivotable member is U-shaped.

4. An extension attachment device as claimed in claim 1 wherein said resilient means is an helical spring located internally in adjacent hollow parts of both said pole and said stationary support.

5. An extension attachment device as claimed in claim 4 wherein the hollow part of said pole is provided with a ledge, and further comprising an assembly supported by said resilient means having a cam element, an external operator having means connected to said cam element, the latter normally being engaged by said ledge to prevent relative movement between said pole and said stationary support member, and said external operator upon being moved in a predetermined direction causing said cam element to be pulled off said ledge and said assembly and resilient means permitting relative movement between said pole and said stationary support member.

6. An extension attachment device as claimed in claim 5 wherein said means connected between the external operator and the cam element is a flexible cable.

7. An extension attachment device as claimed in claim 3 wherein said operating means for the power tool is a trigger, and the bight portion of said U-shaped pivotable member engages said trigger to actuate the same.

8. An extension attachment device as claimed in claim 1 wherein the means for removably securing a power tool thereon is a clamp provided with a toggle-action swinging bar arm.

9. An extension attachment device as claimed in claim 5 wherein said pole is provided with an opening adjacent to said handle and said external operator is a finger piece projecting through said opening and manually operable.

* * * * *